United States Patent
Bloechl

(10) Patent No.: US 11,105,917 B1
(45) Date of Patent: *Aug. 31, 2021

(54) SYSTEM AND METHOD FOR GENERATING PHASE-COHERENT SIGNALING WHEN RANGING BETWEEN WIRELESS COMMUNICATIONS NODES AND TO ACCOUNT FOR PHASE SHIFT THEREBETWEEN

(71) Applicant: Link Labs, Inc., Annapolis, MD (US)

(72) Inventor: Mark O. Bloechl, Elkridge, MD (US)

(73) Assignee: Link Labs, Inc., Annapolis, MD (US)

(*) Notice: Subject to any disclaimer, the term of this patent is extended or adjusted under 35 U.S.C. 154(b) by 0 days.

This patent is subject to a terminal disclaimer.

(21) Appl. No.: 17/155,303

(22) Filed: Jan. 22, 2021

Related U.S. Application Data

(63) Continuation-in-part of application No. 17/108,272, filed on Dec. 1, 2020, now Pat. No. 10,985,787.

(51) Int. Cl.
  *G01S 7/288* (2006.01)
  *H04B 1/00* (2006.01)
  (Continued)

(52) U.S. Cl.
  CPC .............. *G01S 13/84* (2013.01); *G01S 7/288* (2013.01); *G01S 7/415* (2013.01); *H04B 1/0096* (2013.01);
  (Continued)

(58) Field of Classification Search
  CPC ................ H04B 1/0096; H04B 1/0475; H04B 2001/0416; H04B 2001/045; H04B 1/7085; H04B 10/613; H04B 10/6161; H04B 10/6164; H04B 10/6165; H04B 1/7075; H04B 10/65; H04B 1/04; H04B 7/0682; H04B 10/61; H04B 10/6162; H04B 10/63; H04B 1/0458; H04B 1/1638; H04B 1/18; H04B 1/30; H04B 2001/70706; G01S 7/415; G01S 7/288; G01S 2007/2886; G01S 13/84; H04L 25/4921; H04L 25/03057; H04L 27/3809; H04L 27/2082; H04L 27/2273; H04L 27/2332; H04L 7/3872; H04L 27/2601; H04L 27/34; H04L 27/3405; H04L 27/3494; H04L 2027/003; H04L 25/0202; H04L 25/022; H04L 27/066; H04L 27/22; H04L 27/2275;
  (Continued)

(56) References Cited

U.S. PATENT DOCUMENTS 5,477,199 A   12/1995   Montreuil
5,548,617 A   8/1996    Patel et al.
(Continued)

*Primary Examiner* — Lana N Le
(74) *Attorney, Agent, or Firm* — Charles B. Lobsenz; Brian H. Buck; Potomac Law Group, PLLC

(57) ABSTRACT

Provided are a system and method for generating phase-coherent signaling when ranging between a transmitting node and a receiving node during wireless communication. Phase coherence is established in response to phase adjustment of a signal to be transmitted from the receiving node, in which such adjustment is commensurate with at least an amount of phase attributable to signaling transmitted by the transmitted node and received at the receiving node. Phase shift attributable to the signaling is compensated for upon receipt of the signaling at a tag in communication with the receiving node.

10 Claims, 13 Drawing Sheets

(51) Int. Cl.
*H04L 27/20* (2006.01)
*G01S 13/84* (2006.01)
*G01S 7/41* (2006.01)
*H04W 84/20* (2009.01)
*H04L 25/49* (2006.01)

(52) U.S. Cl.
CPC ...... *H04L 25/4921* (2013.01); *H04L 27/2082* (2013.01); *H04W 84/20* (2013.01)

(58) Field of Classification Search
CPC . H04L 27/233; H04L 27/2655; H04L 27/266; H04L 27/2665; H04L 27/2679; H04L 7/042; H04L 7/091; H03C 3/0925; H03C 3/0941; H03C 3/095; H03C 3/0991; H03C 5/00; H04W 84/20; H04W 24/02
See application file for complete search history.

(56) References Cited

U.S. PATENT DOCUMENTS

| | | | |
|---|---|---|---|
| 6,084,932 A | 7/2000 | Veintimilla | |
| 6,097,766 A | 8/2000 | Okubo et al. | |
| 6,236,675 B1 | 5/2001 | Bedingfield et al. | |
| 6,480,555 B1 | 11/2002 | Renard et al. | |
| 6,665,308 B1* | 12/2003 | Rakib | H04L 25/03343 |
| | | | 348/E7.07 |
| 6,771,590 B1 | 8/2004 | Marchok et al. | |
| 7,474,677 B2 | 1/2009 | Trott | |
| 2001/0001616 A1 | 5/2001 | Rakib et al. | |
| 2007/0186258 A1 | 8/2007 | Dapper et al. | |
| 2007/0274477 A1 | 11/2007 | Chen | |
| 2012/0032855 A1* | 2/2012 | Reede | G01S 13/84 |
| | | | 342/458 |
| 2013/0343490 A1* | 12/2013 | Wertz | H04B 17/21 |
| | | | 375/340 |
| 2014/0270032 A1* | 9/2014 | Liu | H04W 52/0209 |
| | | | 375/376 |
| 2014/0301494 A1* | 10/2014 | Hsu | H04B 7/022 |
| | | | 375/267 |
| 2015/0215880 A1 | 7/2015 | Rafique et al. | |
| 2016/0113013 A1 | 4/2016 | Dark et al. | |
| 2018/0157330 A1* | 6/2018 | Gu | G01S 7/415 |
| 2019/0253282 A1* | 8/2019 | Hadaschik | H04L 25/022 |
| 2020/0022607 A1* | 1/2020 | Pratt | A61B 5/6892 |

\* cited by examiner

FIG. 8B

From 870

TAG CALCULATES COORDINATE POSITION
BASED ON CALCULATED RANGING DATA
880

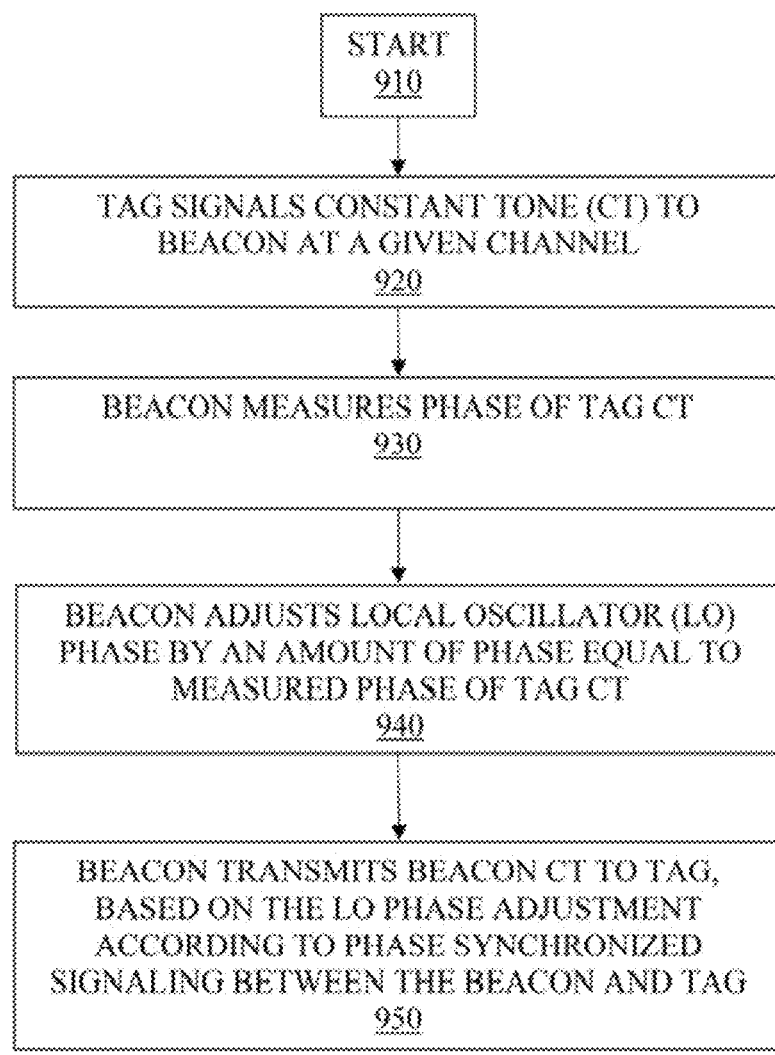

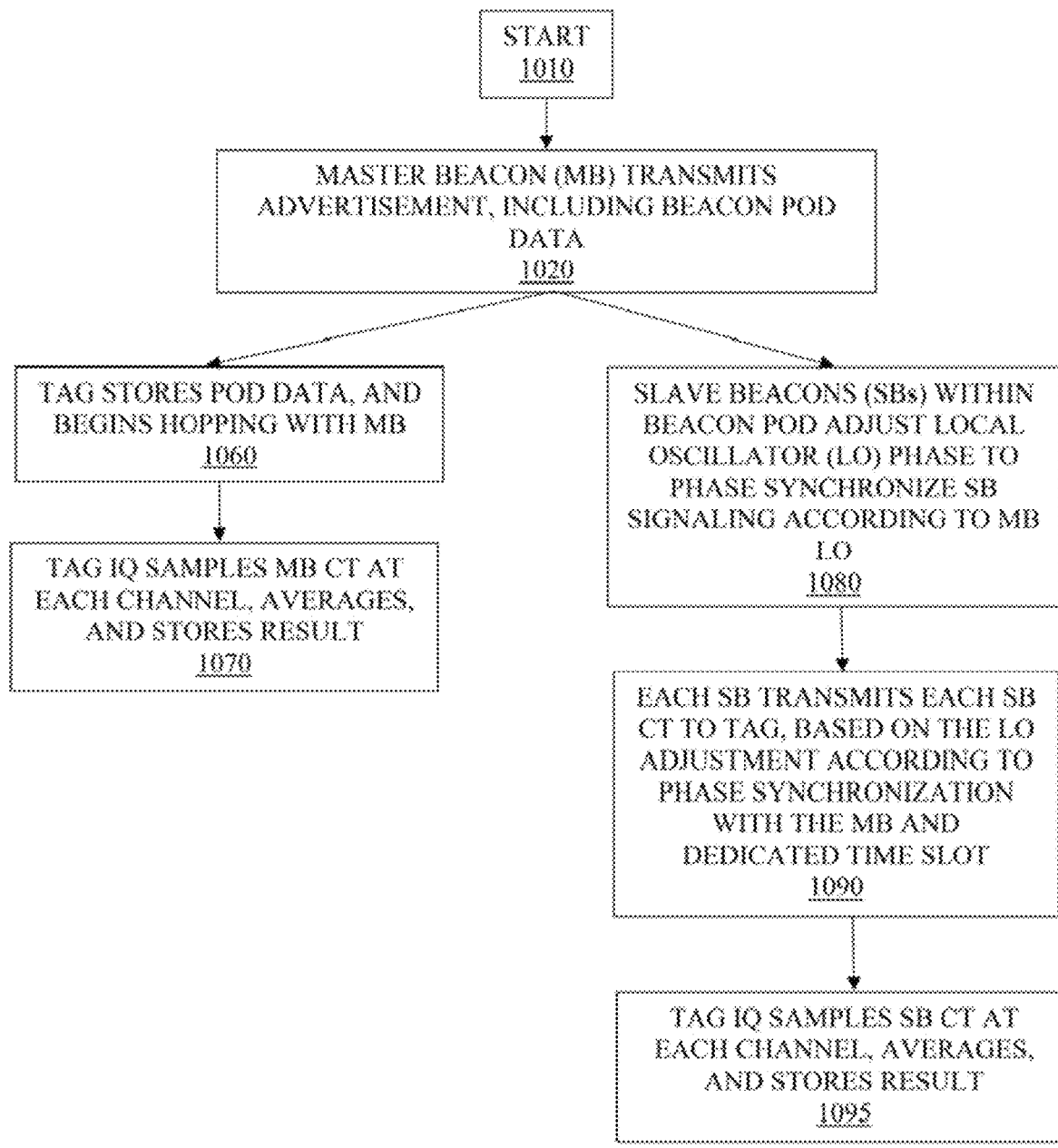

FIG. 11
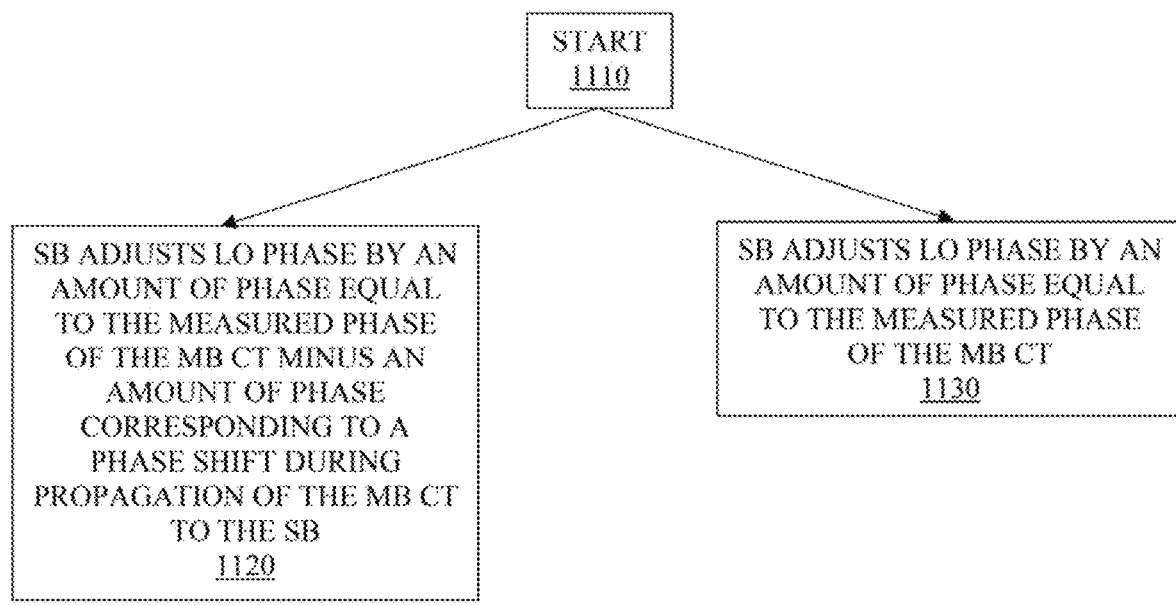
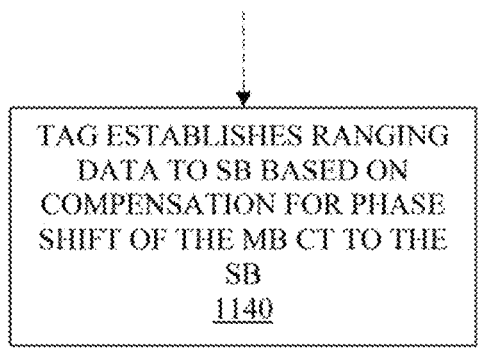

SYSTEM AND METHOD FOR GENERATING PHASE-COHERENT SIGNALING WHEN RANGING BETWEEN WIRELESS COMMUNICATIONS NODES AND TO ACCOUNT FOR PHASE SHIFT THEREBETWEEN

CROSS-REFERENCE TO RELATED APPLICATIONS

This application is a continuation-in-part of application Ser. No. 17/108,272, filed Dec. 1, 2020, the entire contents of which are hereby incorporated by reference.

FIELD OF THE DISCLOSURE

Disclosed embodiments relate to wireless communications systems and the operation thereof, and more specifically, to the generation of phase-coherent signaling between wireless communications nodes, such as beacons and tags or multiple ones of beacons.

BACKGROUND

Many different applications exist which require the physical location of objects to be determined and/or tracked over time. Examples include asset tracking solutions such as those deployed in hospitals, warehouses, manufacturing facilities and construction locations. Other solutions involve the tracking of people such as in assisted living facilities or various work environments where knowing the physical location of people over time and/or at the current moment is an important characteristic of overall performance.

These applications, often referred to as "Real Time Location Systems" or "RTLS", are used in any number of scenarios in which the location of one or more physical objects are tracked over time. Typically, the objects being tracked are "tagged" with small wireless capable tags that are attached to the object(s) being tracked. These tags are ideally low cost and transmit using a low power protocol, such as Bluetooth or Bluetooth Low Energy (BLE) or other such a protocol having characteristic low power drain.

Object tracking applications are typically implemented using a user interface which shows the location of the tags in real time in graphical form or via some other reporting format. Location determination of the tags as they move around may be accomplished via various ranging techniques in which the distance between the tag and one or more system components (herein generically referred to as a "beacon") is determined. The RTLS generally require use of multiple beacons when arriving at the location determination(s). These locations are collectively used to calculate a real time geographical position for the tag, and thus a position for the object(s) being tracked as a result of being attached to or otherwise in the immediate physical vicinity of the tag.

In some RTLS systems, one or more beacons "advertise" their presence via periodic wireless transmissions and when a location determination is required, a predetermined handshaking process occurs between the tag and the beacons after the tag undertakes determination of ranging to a respective beacon or beacons and its location determination based thereon. Alternatively, other RTLS systems function such that the tag instead advertises its presence to the beacon and initiates the handshaking protocol when a location determination is required.

As one might imagine, accurate location determination for objects in these RTLS systems is directly dependent on the accuracy of the ranging values calculated between the tags and each of the beacons. In some systems, a minimum of four (4) beacon-tag ranges is preferred in order to establish a confident geographic coordinate for the tag. If even one of the ranges calculated diverges even minimally from the actual value, the location estimation for the tag can be unusably inaccurate. By way of example, in a hospital environment, while it may not be a requirement to know exactly where in the room a specific piece of equipment is located, at least knowing which room the equipment is in would typically be a minimum requirement. If ranging error is significant enough, the wrong room for a piece of equipment could be reported.

Ranging errors can be caused by a number of factors including environmental conditions such as noise, multi-path channel effects, clock synchronization and sampling artifacts. Time synchronization and frequency accuracy, or lack thereof, as between the tag and the beacons, can significantly affect ranging accuracy because of the high rate of radio wave propagation. As a result, even small timing errors can cause very significant ranging errors.

Even with the above, perhaps the most significant source of ranging errors results from interference due to the collision of transmissions on the same frequencies. In many cases, an RTLS deployment in an industrial, office or even residential environment will necessarily have to co-exist with other RF systems which transmit on the same frequencies as are used by the RTLS system. For example, the multitude of devices operating on WiFi networks will often interfere with the beacon-tag transmissions since both often operate, at least to some degree, in the same unlicensed spectrum.

Relative to the various paradigms for determining ranging, including, for example, Time of Flight (ToF) and Time Difference of Arrival (TDOA), phase, i.e., the angular relationship among transmitted and received signaling for a given frequency and measured time period, may be assessed to determine usable ranging data. Sources of ranging error such as lack of timing synchronization and frequency offset, as discussed above and when existing between transmitted and received signaling, directly effect shift in the aforementioned phase. In other words, phase shift, when left unaddressed, skews opportunity to obtain usable ranging data based on implementation of ToF and TDOA frameworks, and also, therefore, an ability to accurately calculate a geographical position of a tag.

In this regard, data compiled when the above frameworks are implemented may be manipulated and/or evaluated to negate the effect of phase shift on applicable ranging measurement data. To do so, however, system transmission components may be required to effectively cooperate to achieve viable phase coherence, i.e., constant or same phase shift, for signaling capable of producing ranging measurement data.

In view of such cooperation, however, it would also be advantageous to account for or reconcile such phase shift with greater independence among the system transmission components. Doing so, it will be understood, will enhance analysis of signal transmission, and thus increase accuracy in the geolocation of the tag. This way, an optimized RTLS may be deployed to provide any or all of the following, including, for example, proximity sensing, alert systems, jobsite and warehouse asset monitoring, and tracking of assets to be inventoried and for which location must be determined.

SUMMARY

It is to be understood that both the following summary and the detailed description are exemplary and explanatory and are intended to provide further explanation of the present embodiments as claimed. Neither the summary nor the description that follows is intended to define or limit the scope of the present embodiments to the particular features mentioned in the summary or in the description. Rather, the scope of the present embodiments is defined by the appended claims.

An embodiment may include a system for generating phase-coherent wireless signaling, including a first node configured to transmit at least a first Constant Tone (CT) across channels of a given frequency band; and a second node configured to (a) receive the at least a first CT at a given one of said channels, and synchronize a frequency of a local oscillator (LO) thereof according to a frequency of the at least a first CT, (b) downconvert the at least a first received CT to generate a complex baseband signal (CBS), (c) sample the CBS in in-phase and quadrature (IQ) format over a predetermined time to measure a phase of the CBS, and (d) adjust a phase for the LO, based on the measured phase of the CBS, to synchronize a phase of at least a second CT, to be transmitted from the RN, with the measured phase of the CBS at the given one of the channels, wherein the first node is further configured to transmit position information corresponding to the first node and the second node when transmitting the at least a first CT, and the at least a second CT to be transmitted from the second node comprises an amount of phase defined by a phase shift attributable to propagation of the at least a first received CT from the first node to the second node.

A further embodiment may include a method of generating phase-coherent wireless signaling, including transmitting, from a first node, at least a first Constant Tone (CT) across channels of a given frequency band, and at a second node, (a) receiving the at least a first CT at a given one of said channels, and synchronize a frequency of a local oscillator (LO) thereof according to a frequency of the at least a first CT, (b) downconverting the at least a first received CT to generate a complex baseband signal (CBS), (c) sampling the CBS in in-phase and quadrature (IQ) format over a predetermined time to measure a phase of the CBS, and (d) adjusting a phase for the LO, based on the measured phase of the CBS, to synchronize a phase of at least a second CT, to be transmitted from the second node, with the measured phase of the CBS at the given one of the channels, wherein the first node is further configured to transmit position information corresponding to the first node and the second node when transmitting the at least a first CT, and the at least a second CT to be transmitted from the RN comprises an amount of phase defined by a phase shift attributable to propagation of the at least a first received CT from the first node to the second node.

In certain embodiments, the disclosed embodiments may include one or more of the features described herein.

BRIEF DESCRIPTION OF THE DRAWINGS

The accompanying drawings, which are incorporated herein and form a part of the specification, illustrate exemplary embodiments and, together with the description, further serve to enable a person skilled in the pertinent art to make and use these embodiments and others that will be apparent to those skilled in the art. Embodiments herein will be more particularly described in conjunction with the following drawings wherein:

FIGS. 8A and 8B are sequence diagrams illustrating a manner of establishing phase-coherent signaling among a transmitting node (TN) and a receiving node (RN) as basis for establishing ranging data usable to geolocate the TN;

FIG. 9 is a sequence diagram illustrating a manner of establishing phase-coherent signaling among a tag and a beacon, in accordance with FIG. 3;

FIGS. 10 and 11 are sequence diagrams illustrating a manner of establishing phase-coherent signaling among members of a beacon pod and accounting for phase shift in signaling therebetween, in accordance with FIG. 5.

DETAILED DESCRIPTION

Figure 1:
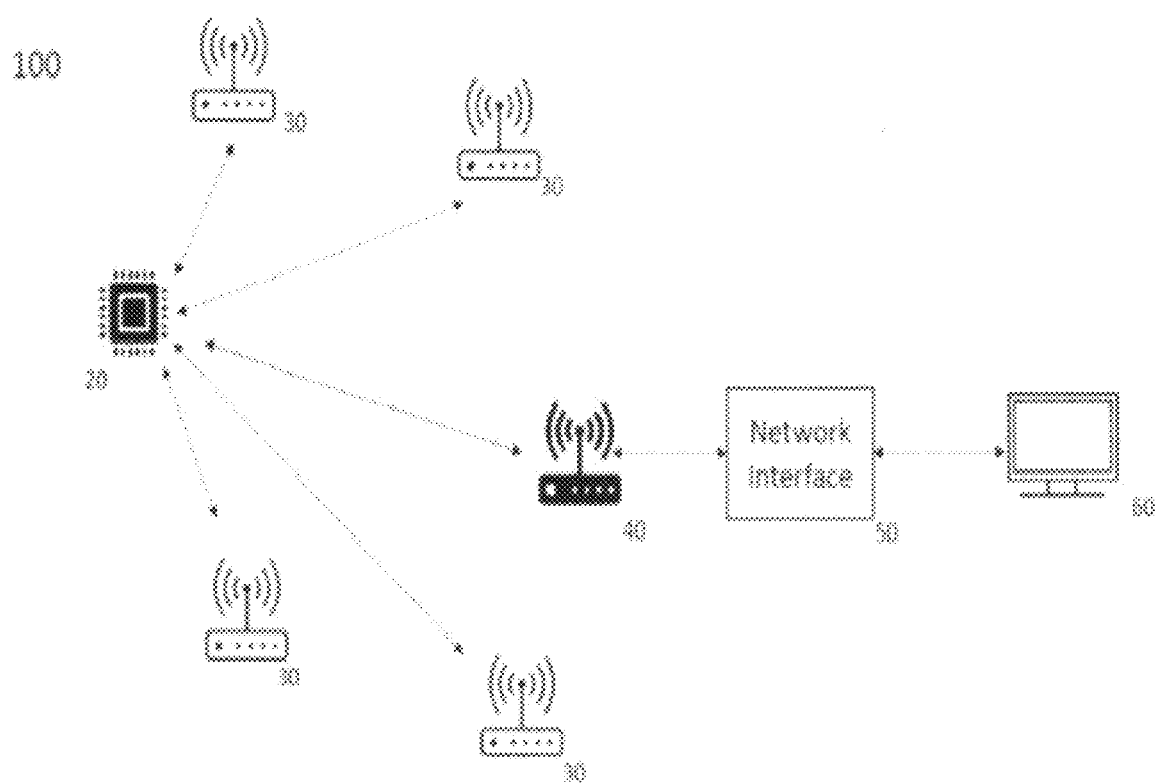
FIG. 1 is an illustration of a network providing wireless communications in accordance with embodiments herein.

The present disclosure will now be described in terms of various exemplary embodiments. This specification discloses one or more embodiments that incorporate features of the present embodiments. The embodiment(s) described, and references in the specification to "one embodiment", "an embodiment", "an example embodiment", etc., indicate that the embodiment(s) described may include a particular feature, structure, or characteristic. Such phrases are not necessarily referring to the same embodiment. The skilled artisan will appreciate that a particular feature, structure, or characteristic described in connection with one embodiment is not necessarily limited to that embodiment but typically has relevance and applicability to one or more other embodiments.

In the several figures, like reference numerals may be used for like elements having like functions even in different drawings. The embodiments described, and their detailed construction and elements, are merely provided to assist in a comprehensive understanding of the present embodiments. Thus, it is apparent that the present embodiments can be carried out in a variety of ways, and does not require any of the specific features described herein. Also, well-known functions or constructions are not described in detail since they would obscure the present embodiments with unnecessary detail.

The description is not to be taken in a limiting sense, but is made merely for the purpose of illustrating the general principles of the present embodiments, since the scope of the present embodiments are best defined by the appended claims.

It should also be noted that in some alternative implementations, the blocks in a flowchart, the communications in a sequence-diagram, the states in a state-diagram, etc., may occur out of the orders illustrated in the figures. That is, the illustrated orders of the blocks/communications/states are not intended to be limiting. Rather, the illustrated blocks/communications/states may be reordered into any suitable order, and some of the blocks/communications/states could occur simultaneously.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedure, Section 2111.03.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items. As used herein, the singular forms "a", "an" and "the" are intended to include the plural forms as well, unless the context clearly indicates otherwise.

The word "exemplary" is used herein to mean "serving as an example, instance, or illustration." Any embodiment described herein as "exemplary" is not necessarily to be construed as preferred or advantageous over other embodiments. Additionally, all embodiments described herein should be considered exemplary unless otherwise stated.

The word "network" is used herein to mean one or more conventional or proprietary networks using an appropriate network data transmission protocol, or other specification and/or guidelines which may be applicable to the transfer of information. Examples of such networks include, PSTN, LAN, WAN, WiFi, LTE, CBRS, and the like.

The phrase "wireless device" is used herein to mean one or more conventional or proprietary devices using radio frequency transmission techniques or any other techniques enabling the transfer of information. Examples of such wireless devices include cellular telephones, desktop computers, laptop computers, handheld computers, electronic games, portable digital assistants, MP3 players, DVD players, or the like.

Bluetooth Low Energy (BLE) networking enables detection and connection among devices that generally do not require continuous connection therebetween in order for an exchange of information in the form of data to occur. Yet, such devices depend upon extended battery life in order that the opportunity for such an exchange may continue to reliably exist. The devices themselves vary in their construction, whether, for example, a sensor, a cellphone, a network access point, or some other object configured to enable and/or provide BLE communication(s) and which is either stationary or mobile, such as a BLUETOOTH tag. In the context of BLE networking, such devices are prescribed by the BLUETOOTH Core Specification 4.0 and are compatible with IEEE 802.15.1, as appropriate.

Embodiments herein may encompass signaling on either a BLE network, or another wireless network so as to demonstrate implementation of the phase-coherent signaling discussed herein. Turning now to FIG. 1, a description of the system 100 according to an embodiment is provided.

System 100 and its components may be configured to be operable in accordance with BLE protocol, such that each of the aforementioned components are configured for BLE communications. System 100 typically includes multiple tags 20—only one is shown in FIG. 1 for clarity. Tag 20 may be attached to or associated with a particular object for the purposes of tracking the location of that object. Tags 20 are capable of wirelessly communicating with other components of system 100 as more fully described herein. System 100 also includes a plurality of beacons 30 which also communicate wirelessly with other components of system 100 such as with tags 20. In this regard, the dashed arrows indicate a versatility in directional communication between a respective beacon and a respective tag, such that both one-way and two-way communication is contemplated based on an applicable ranging measurement technique that may be employed, as discussed herein. Beacons 30 are located at very specific geographic coordinates within the area within which objects are to be tracked. Beacons 30 are installed in these locations and during the time of installation, their specific locations are entered into system 100 so that system 100 is always aware of the known exact physical locations of each such beacon 30.

System 100 may also include one or more access points 40. These access points 40 may also serve in the same capacity as beacons 30 in that their location is known to system 100 and such that they may communicate with tags 20 as described herein for the purpose of location determination as more fully described herein. In addition, access points 40, if present, also provide a connection to network interface 50 which permits data to be shared with and received from other networks such as the internet. This functionality may alternatively be provided by one or more beacons 30 in lieu of access point 40. In one embodiment, data is transmitted and received via backhaul to the internet such that a cloud based application may be accessed by a user via client 60 to view object location information and also to allow the user to configure various aspects related to the functionality of system 100.

Tags 20 are responsible for executing any coordinate location determination process locally and then reporting the location determination to system 100 via a communication to an access point 40 (or a beacon 30).

Figure 2:
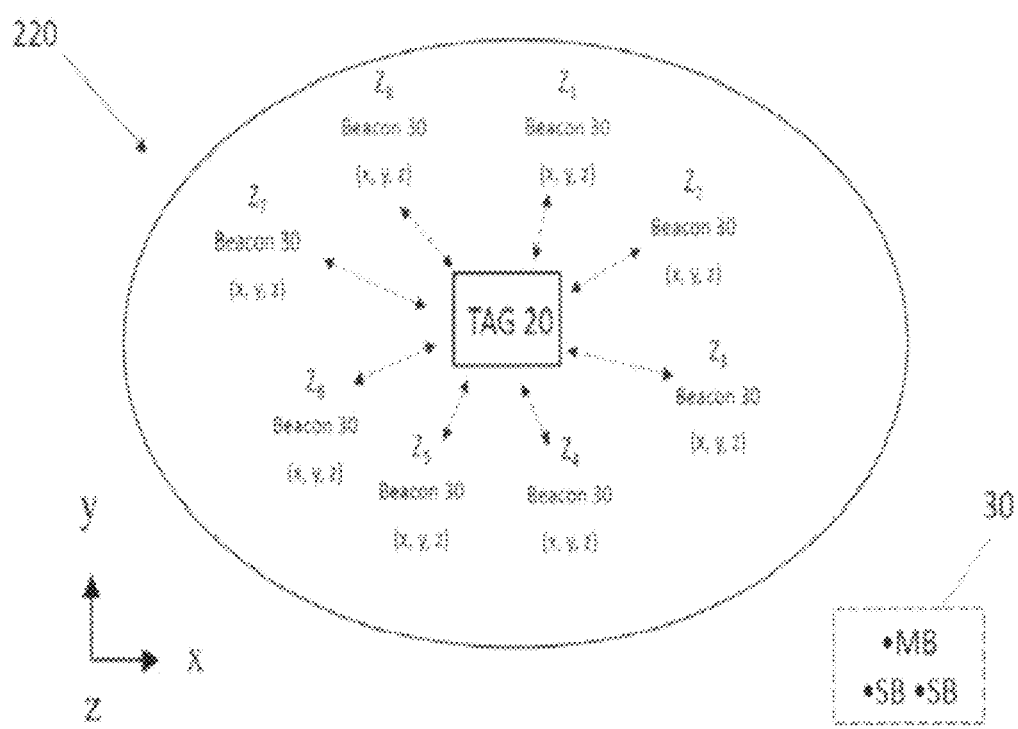
FIG. 2 is an illustration of an area configuration of beacons relative to which a tag may determine its coordinate location relative to such beacons, according to embodiments herein.

With reference now to FIG. 2, a description of the communication protocol by and between tag 20 and beacons 30 within system 100 and according to an embodiment is provided. Accordingly, tag 20 may be configured to interact with one or more beacons 30 disposed throughout zones Z1-Z8, for example, to exchange wireless communications in connection with exchanging phase-coherent signaling therebetween, i.e., signaling having constant or same phase shift. As such, each of the tags 20 and the beacons 30 may engage in bi-directional communications in which such communications may be characterized by Constant Tone (CT), i.e., a Continuous Wave Tone. In other words, communications sent by at least one of each of the tags 20 and beacons 30 may include such a CT at, for example, the carrier frequency or at an offset of, for example, 250 kHz. Such CT may be transmitted as part of all communications exchanged between tag 20 and beacon 30, and may be sampled by each tag 20 and beacon 30 in IQ, or quadrature, format. That is, such sampling may be understood wherein I represents the amplitude of an in-phase carrier, and Q represents the amplitude of the quadrature-phase carrier. The sampling may be carried out by each of the tags 20 and beacons 30, as discussed below.

Additionally, IQ sampling may occur with respect to wireless communications as between multiple ones of beacons, relative to the ranging measurement technique which may be employed, as discussed herein. In this respect, each one of beacons 30 may assume a pod configuration including members disposed therein in a master-slave relationship. In particular, each such pod may include at least one first or master beacon (MB) and at least two (2) second or slave beacons (SBs).

It will be understood that each of the tags 20 and beacons 30 may be equipped with all of the necessary hardware and/or software necessary for executing the aforementioned CT enabled communications, as well as the IQ sampling in connection therewith. It will also be understood that each of the tags 20 and beacons 30 may be equipped with all of the necessary hardware and/or software for executing the herein discussed phase synchronization as related to an exchange of CT enabled communications.

In a case in which each of the tag 20 and one or more beacons engage in two-way communications, tag 20 (or Node A as referred to in the equations below) may perform a scan within setting 220 to detect those beacons 30 (or Nodes B as referred to in the equations below) that are enabled to transmit the CT, as will be identified by encoding within a respectively transmitted and received beacon advertisement message from a beacon 30. Upon detection, the tag 20 may initiate a connection with the first detected beacon 30, and transmit signaling in response to the beacon advertisement message received from the beacon 30. In particular, one or more portions of the response signal, as transmitted, may be described by the following:

$e^{j(\omega_A t + \varphi_A)}$, in which tag e is Euler's number,
j is the square root of −1,
$\omega_A$ is the angular frequency of tag 20's signal, and
$\varphi_A$ is an arbitrary phase shift of tag 20's signal.

The response may then be received by the beacon 30 as the following:

$e^{j(\omega_A t + \varphi_A + \varphi_{AB}(f,r))}$, in which $\varphi_{AB}(f,r)$ is the phase shift introduced during propagation, given as a function of frequency (f) and range (r) by $\varphi(f,r) = -2\pi fr/c$, where c is the speed of light.

In a case in which one-way communication occurs in the context of the beacon 30 configuration shown in dashed lines to include a master beacon MB and at least two (2) slave beacons (SBs), it will be understood that applicable references in the above to the tag 20 and beacon 30 may be otherwise correspondingly assigned to the MB and the SB.

Figure 3:
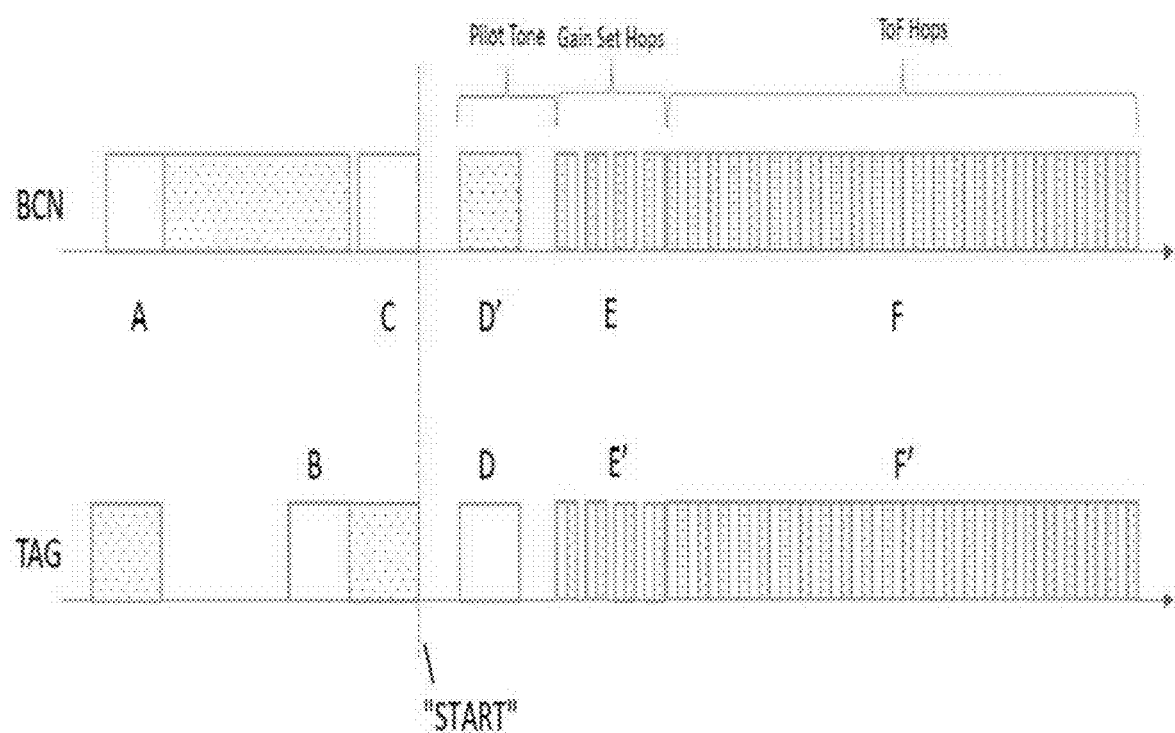
FIG. 3 is a schematic diagram of a ranging protocol for Time of Flight (ToF) measurement, according to embodiments herein.
Figure 7:
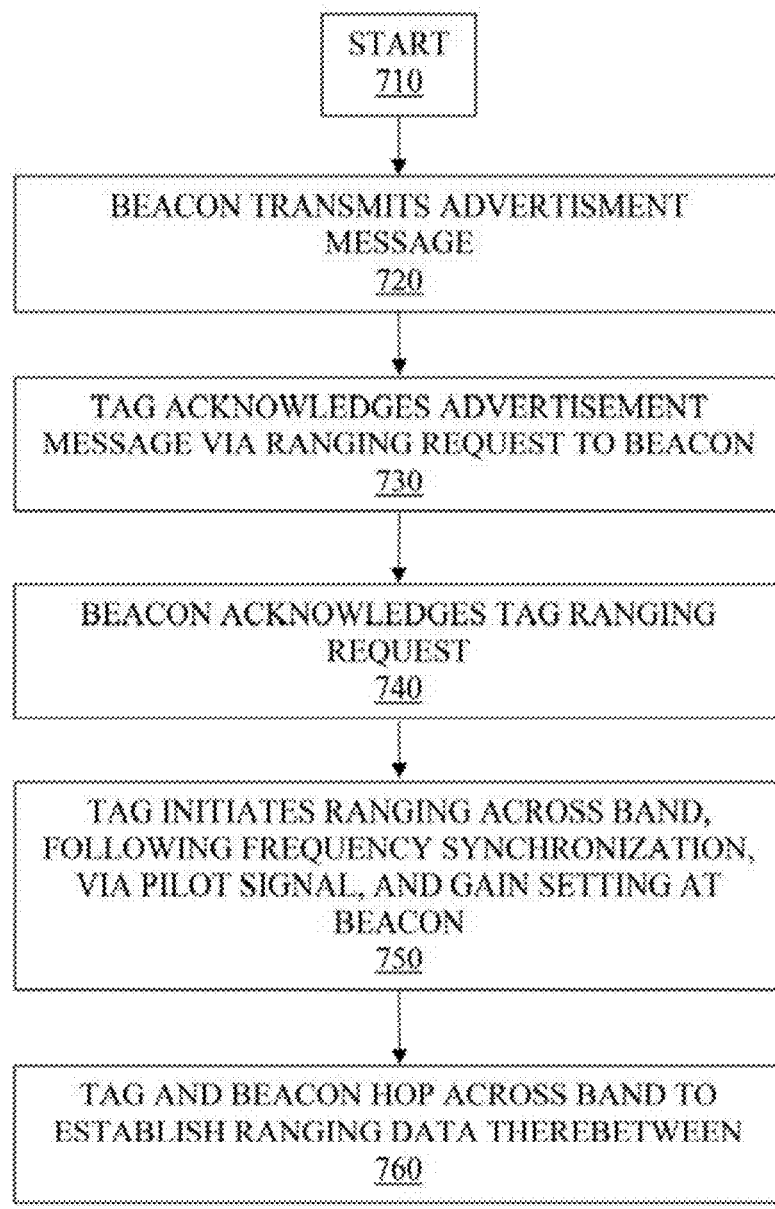
FIG. 7 is a sequence diagram illustrating wireless communication between a tag and a beacon for establishing ranging data in accordance with FIG. 3.

Referring to FIGS. 3 and 7, there is illustrated a ranging protocol for ToF measurement between a tag 20 and a beacon ("BCN") 30, i.e., with respect to bi-directional communications therebetween across given channels of an exemplary wireless communications band, e.g., BLE. As discussed herein, such communications enable achievement of phase-coherent signaling between the tag 20 and the beacon 30 so as to thereby enable the establishment of ranging data at the tag 20.

A description of the process for initiating and exchanging CTs between tag 20 and beacon 30 according to ToF measurement is now provided. The first step is for beacon 30 to transmit an advertisement message to all tags 20 within range. This is represented at "A" on the beacon 30 timeline at the top (see step 720). Such messages are periodically and repetitively transmitted until such time as acknowledged by tag 20 via a request by tag 20 to begin the ranging process. This acknowledgement and request is represented at "B" on the timeline for tag 20 (see step 730).

Upon receipt of the request from tag 20, beacon 30 then acknowledges the request at "C" by sending an acknowledgement message to tag 20 (see step 740). Following this, tag 20 sends a pilot signal (defining a single CT) to beacon 30 at "D," to enable the beacon 30 to detect offset between local oscillator (LO) frequencies corresponding to the tag and the beacon 30, and to synchronize frequency with the tag 20 at "D'." In accordance with this CT and resulting synchronization, the beacon 30 and tag 20 may then engage in a series of hops, at E and E', so that each of the beacon 30 and the tag 20 may set its relative gain. Substantially simultaneously with transmission of the pilot signal, the tag 20 sends a "Start" message to beacon 30 to initiate the ranging timing that ought to begin following gain setting at the beacon 30 and/or the tag 20. See step 750. This message starts the hop frame timer which allows beacon 30 and tag 20 to synchronize timing for the series of CT hops which is about to come, for the purpose of establishing ranging data (see step 760). In particular, the LOs for both tag 20 and beacon 30 must remain in synch and locked during the duration of each hop, i.e., the LOs may lay dormant in between hops. In a preferred embodiment of the invention, a BLE chip manufactured by Nordic Semiconductor, such as the nRF52833 Bluetooth v 4.2 and BT5 chip may be employed in both beacon 30 and tag 20 to provide PPI (Programmable Peripheral Interconnect) and LO capabilities as desirable for implementing the teachings provided by the embodiments herein.

As noted, once the start message is received by beacon 30, the hop frame timer is triggered for both beacon 30 and tag 20 via, for example a PPI interface. Once synchronized and gain has been set, tag 20 and beacon 30 begin to exchange CT tones across the given frequency band for the purpose of generating signaling for establishing ranging data therebetween. This is shown as across the set of boxes corresponding to "F" for the beacon 30 and as similarly illustrated with respect to the tag 20 at "F'." In one embodiment, the band is used with a 1 MHz sample rate across a 100 MHz bandwidth, resulting in 100 tone exchanges to be made, although more or less samples could be used across a wider or narrower band and/or in a different licensed or unlicensed band without departing from the scope or spirit of the embodiments herein.

Figure 4:
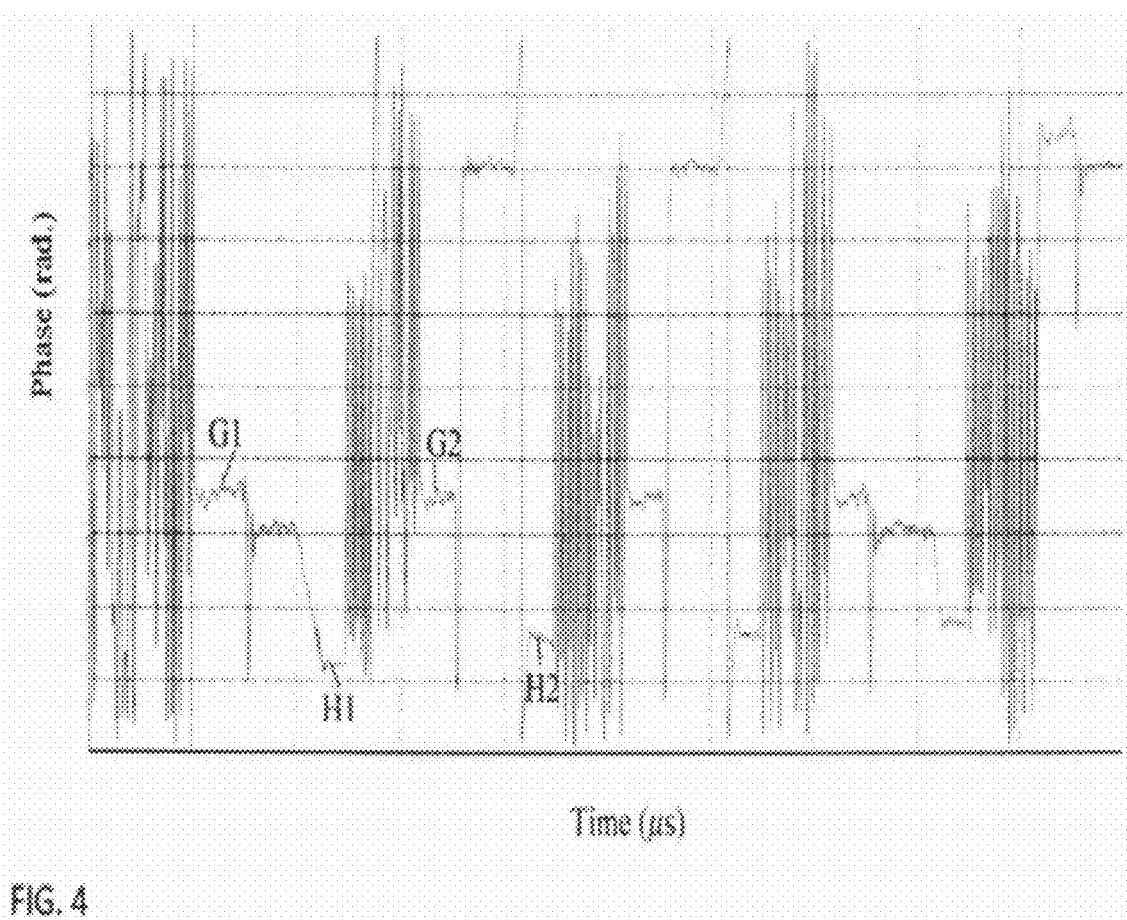
FIG. 4 is a chart illustrating a relationship between phase and time demonstrating phase-coherent signaling among a tag and a beacon, in accordance with FIG. 3.

Referring to FIG. 4, there is illustrated a relative relationship among phase and time for ranging hops, in accordance with the protocol of FIG. 3 and within a given channel. That is, for a given CT transmitted by the tag 20 at each of G1 and G2, for example, the beacon 30 may synchronize its LO phase to that of the CT received from the tag 20. As a result, the beacon 30 may generate, at H1 and H2, for example, signaling of a CT defining a phase thereof that is directly proportional to an amount of round-trip phase shift of the CT originally transmitted by the tag 20. In accordance with a manner of achieving this proportionality as described herein, phase coherence may thus be established among the tag 20 and beacon 30 for signaling across channels of a given wireless band.

Figure 5:
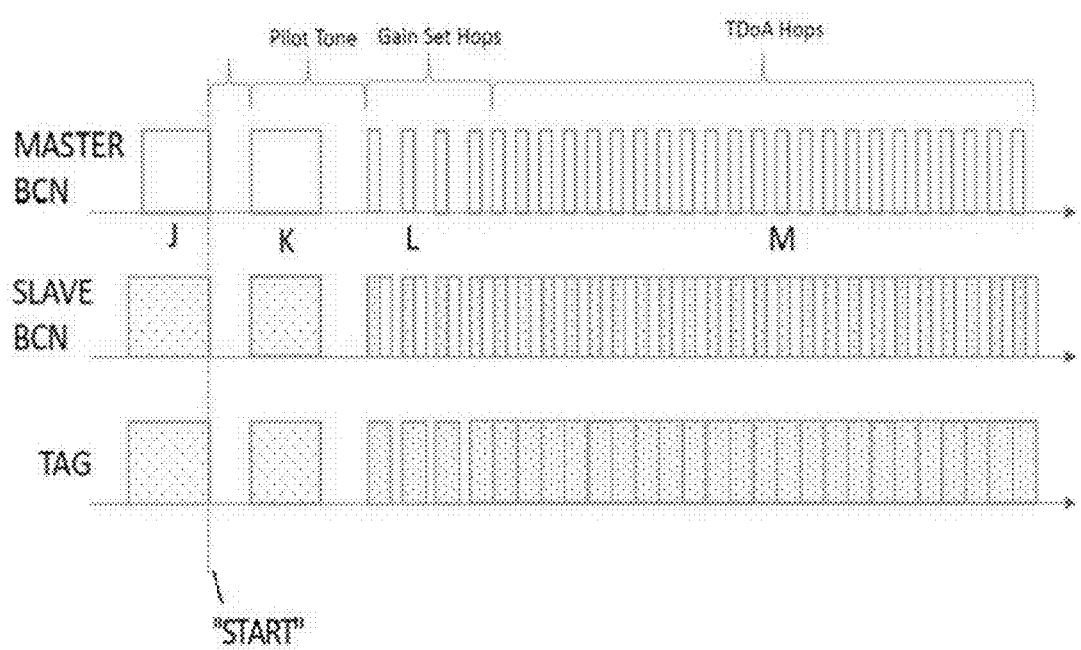
FIG. 5 is a schematic diagram of a ranging protocol for Time Distance of Arrival (TDOA) measurement accounting for phase shift differential, according to embodiments herein.

Referring to FIG. 5, there is illustrated a ranging protocol for TDOA measurement between a tag 20 and a beacon 30, i.e., one-way communications from the beacon 30 to the tag 20 in order to determine a range therebetween. In such protocol, beacon pods are provided and consist of three or more beacons including at least one master beacon MB and at least two or more slave beacons SBs. Similar to the ToF protocol, an advertisement message including a CT is transmitted at "J" and followed by transmission of a pilot signal at "K," as well as gain setting and ranging hops at "L" and "M," respectively. Unlike the ToF protocol, however, the MB assumes the role of the tag with respect to each of slave beacons SBs within their given pod. In this way, the tag 20 is left to merely listen for advertisement messages transmitted from each of the MB and SBs for a respective pod. As between a MB and SBs, the MB advertisement message includes position information defined by its coordinates and those of SBs within its pod, as well as predetermined timing for transmission of advertisement messages from SBs to the tag 20, which is offset from a transmission timing attributable to the MB. Notably, however, phase synchronization here occurs with respect to LOs of each of the pod's MB and individual SBs, such that the MB LO acts a phase datum that is common to each of the SBs within the pod. Accordingly, phase coherence may be established for signaling as between each of a MB and constituent SBs for a given beacon pod.

Figure 6:
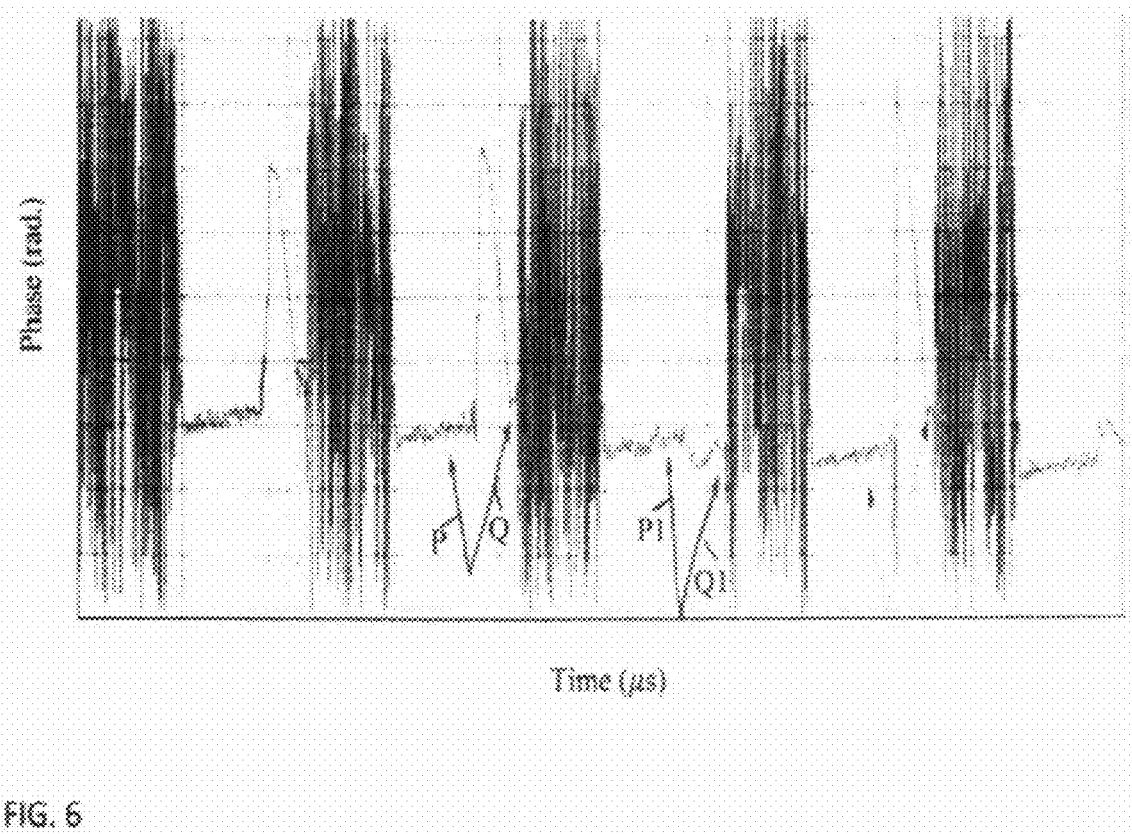
FIG. 6 is a chart illustrating a relationship between phase and time demonstrating phase-coherent signaling among a tag and a beacon, in accordance with FIG. 5.

In referring to FIG. 6, there is illustrated a relative relationship among phase and time for ranging hops, in accordance with the protocol of FIG. 5 and within a given channel. That is, for a given CT transmitted by a MB at each of P and P1, for example, a SB may synchronize its LO phase to that of the CT received from the MB. As a result, the SB may generate, at Q and Q1, for example, signaling of a CT defining a phase thereof that is substantially calibrated to a magnitude of the CT emanated from the MB. In accordance with a manner of achieving such calibration as described herein, phase coherence may thus be established among MB and SB signaling across channels of a given wireless band.

Figure 8A:
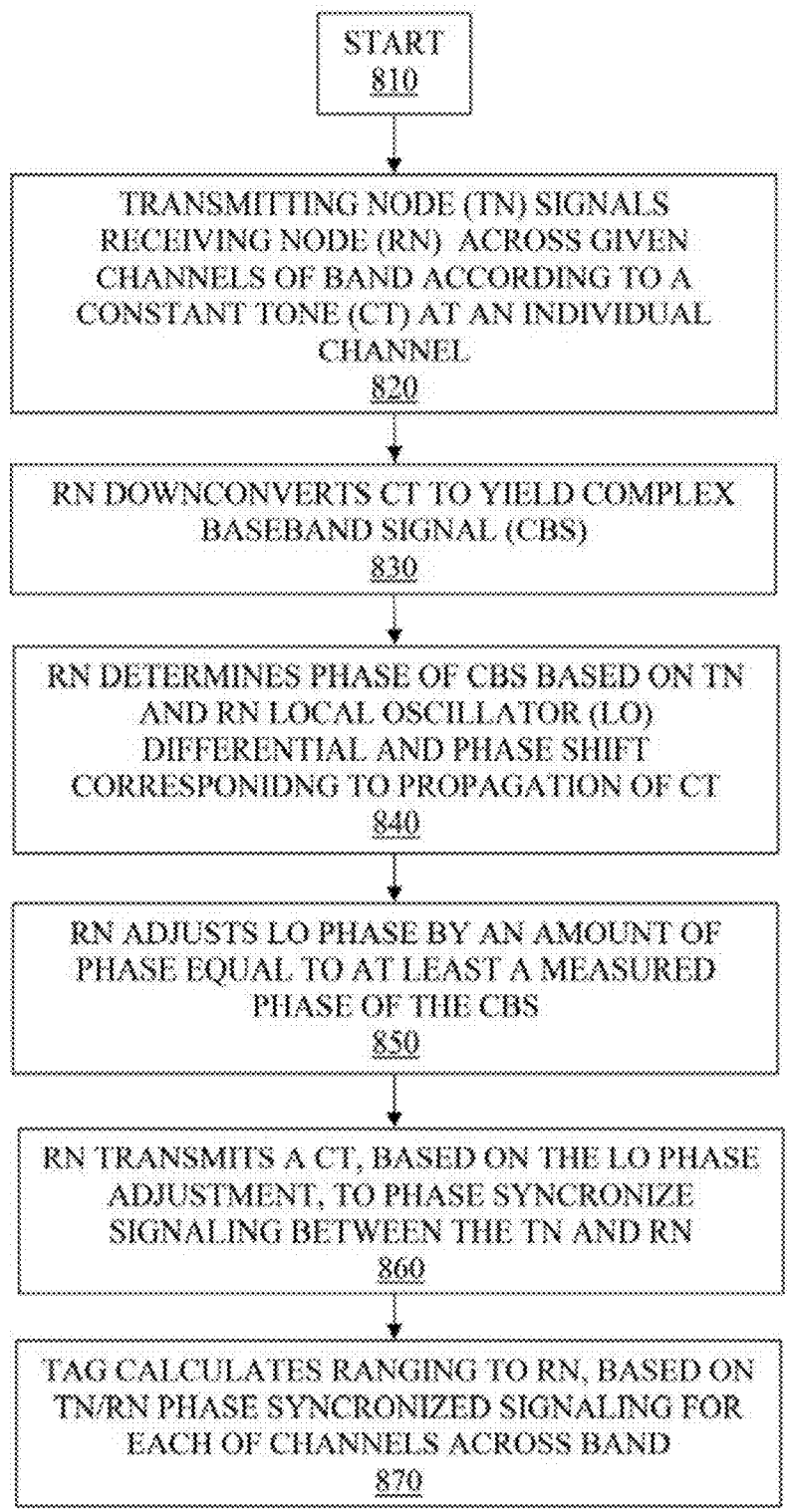

In view of the above, FIGS. 8A and 8B illustrate a manner of establishing phase-coherent signaling as between a transmitting node (TN) and a receiving node (RN), as basis for establishing ranging data that may then be used by the tag 20 for its geolocation. In particular, such a TN may encompass a tag 20 or a MB, and such a RN may encompass any one of a beacon 30, including a SB. Beginning at 810, a TN signals the RN, at 820, according to a CT for each of channels of a given wireless band. The CT may a same or a different CT for each of the channels. The CT may be given by $e^{j(\omega_{TN}t_0 + \varphi_{TN})}$. Upon receipt, the RN downconverts the CT to yield a complex baseband signal (CBS) at 830. The CBS may be given by $Z_{RN} = e^{-j(\omega_{RN}t + \varphi_{RN})} e^{j(\omega_{TN}t + \varphi_{TN} + \varphi_{TRTN})} = e^{j(\Delta\omega t + \varphi_{RN} + \varphi_{TN} + \varphi_{TRTN})}$, wherein in regard to the CT and the CBS, and $\omega_{TN}$ and $\varphi_{TN}$ respectively represent the LO angular frequency and phase at the TN, $\omega_{RN}$ and $\varphi_{RN}$ respectively represent the LO angular frequency and phase at the RN, $\varphi_{TNRN}$ represents a phase shift given while travelling a distance d between the transmitting and receiving nodes, as given by: $\varphi_{AB} = \omega_B \cdot d/c$. At 840, the RN determines the phase of the CBS based on LO phase differential, and corresponding phase shift of the CT during propagation thereof from the TN to the RN (given substantial elimination of frequency differential based on synchronization attributable to the aforementioned pilot signal). Such phase, or $\angle Z_B$, may be given by $(\Delta\omega t + \varphi_{TN} + \varphi_{TNRN}) - \varphi_{RN}$. In particular, the RN may IQ sample $Z_B$ and average the same over a predetermined period to ascertain the angle yielding $\angle Z_B$. At 850, the RN adjusts its LO phase at each ranging hop, i.e., at and/or within each channel, to introduce a phase shift thereto to compensate for the difference in phase between its LO and $\angle Z_B$. For example, the magnitude of the adjustment may be defined by an amount of phase equal to at least the measured phase of the CBS, i.e., $\angle Z_B$. As another example, RN may alternatively adjust the CBS by an amount of phase equal to the difference between the phase of the CBS and the phase shift attributable to propagation of the CT, i.e., an amount of phase of the CBS minus an amount of phase shift attributable to propagation of the CT from the TN to the RN. In order to achieve the aforementioned adjustment, the TN's LO may be directly adjusted, or alternatively, by shifting its LO frequency (via frequency modulation) so as to cause phase to accumulate at a rate dependent on the magnitude and direction of the shift, relative to $\varphi(t)=\omega t$. In this regard, a timer may be used to coordinate a duration for frequency shifting with respect to the targeted amount of phase shift that is to be accumulated, whereafter the TN LO may then be restored to its original carrier frequency. Thereafter at 860, the RN may transmit a CT that is thus phase synchronized with the CT transmitted by the TN so as to achieve phase-coherent signaling as between the TN and the RN. In accordance with such signaling, a tag 20 may thus establish ranging data as between the one or more RNs, as at 870. Such ranging data may include correlations between converted IQ sampling resulting from receipt of the phase synchronized CT for each of given channels of the relevant frequency band. For a ToF scenario wherein communication with at least four (4) beacons 30 has been established, the tag 20 may undertake determination of such data by (a) IQ sampling the received beacon 30 signaling for each channel and storing the same respectively, (b) windowing the samples, according to Hanning or Blackman-Harris, (c) zero-padding the same to a power of two (2), nominally 128, and (d) invoking an Inverse Fast Fourier Transform (IFFT). Based on this information, true and maximum ranges between a tag 20 and respective beacons 30 may be determined, see commonly owned U.S. patent application Ser. No. 16/911,755, entitled "Apparatus and Method for Mitigating Effects of Multipath Interference Between Wireless Communications Nodes Via Constraint of Estimated Node Location," the entirety of which is hereby incorporated by reference. Based on the coordinate information of each beacon 30, as transmitted in its advertisement message, the tag 20 may then, in accordance with discussion as provided in the aforementioned application, undertake a constrained gradient descent analysis to arrive at its own coordinate location, as at 880. Where interference between the tag 20 and beacon 30 is expected for a given channel (as a result of external devices transmitting on a same frequency), tag 20 may transmit a CT in duplicate for such channel, whereupon the protocol of FIG. 3 may then be carried out, see commonly owned U.S. patent application Ser. No. 16/911,690, entitled "Apparatus and Method for Mitigating Interference When Phase Ranging Among Beacons and Tags," the entirety of which is hereby incorporated by reference. For a TDOA scenario in which TDOA measurement provides a framework for assessing phase shift due to difference in radio frequency (RF) path lengths, the tag 20 may undertake determination of such aforementioned ranging data as between the tag and each of the MBs and SBs by calculating path length differences (PLDs) between each MB and SB of a given pod. To do so, the tag 20 may conduct IQ sampling of each of a received signal from a MB and a SB and sort the same into channel or frequency order, whereupon IQ samples may be correlated one-to-one in terms of MB and SB pairs for processing in accordance with (a) through (d) above. Once such processing is complete, a gradient descent analysis may then be conducted by the tag 20 to determine, as at 880, its coordinate location. See, for example, commonly owned U.S. patent application Ser. No. 17/036,079, entitled "Apparatus and Method for Geolocating a Tag Via Phase-Based Time Difference of Arrival Framework," the entirety of which is hereby incorporated by reference, explaining calculation of ranging data based on phase shift in the context of TDOA measurement.

Now referring to FIG. 9, there is illustrated a manner of establishing phase-coherent signaling among a tag 20 and a beacon 30 in accordance with ToF ranging measurement. Therein and during the ranging hops illustrated in FIG. 3, tag 20, proceeds from 910 to 920 whereat it signals a CT to a beacon deemed to be, for example, in an order of closest proximity in accordance with commonly owned U.S. patent application Ser. No. 16/911,840, entitled "Apparatus and Method for Optimizing Wireless End Node Location Determination Via Targeted Proximity Ranging To Clusters Of Other Wireless Nodes," the entirety of which is hereby incorporated by reference. Alternatively, the tag 20 may signal its CT to one or more beacons 30 in an order otherwise determined to be most proximate based on a coordinate analysis as between the tag 20 and such a beacon 30. In this regard, the signal received at the beacon 30 may be given by the following, in which $Z_{TB}$ indicates transmission of a CT from the tag 20 to the beacon and $$Z_{TB} = e^{-j(\omega_B t_0 + \varphi_B)} e^{j(\omega_T t_0 + \varphi_T + \psi_{TB})} = e^{j(\Delta \omega t_0 - \varphi_B + \varphi_T + \psi_{TB})},$$

wherein
$\omega_T$ and $\varphi_T$ respectively represent the tag 20's LO angular frequency and phase;
$\omega_B$ and $\varphi_B$ respectively represent the beacon 30's LO angular frequency and phase;
$t_0$ represents the reception time of the CT at the beacon 30;
$\psi_{TB}$ represents a phase shift of the CT while travelling a distance d between from the tag 20 to the beacon 30, and is given by:

$$\psi_{TB} = \frac{\omega_B \cdot d}{c}.$$

At 930, beacon 30 measures the phase of $Z_{TB}$ as $\angle Z_{TB}$ radians. At 940, and in order to synchronize its LO phase to $\angle Z_{TB}$ (measured according to the CT transmitted from the tag 20), the beacon 30 adjusts its LO phase by an amount of phase equal to $\angle Z_{TB}$ radians. As discussed above, the adjustment may occur at and/or within each channel, for example, in accordance with frequency modulation of the beacon's LO frequency according to an amount of $\angle Z_{TB}$. Once synchronized, the beacon 30, at 950, transmits its CT so as to yield a CBS at the tag 20 according to the following, in which:

$$Z_{BT} = e^{-j(\omega_T t_1 + \varphi_T)} e^{j(\omega_B t_1 + \Delta \omega t_0 + \varphi_T + \psi_{TB} + \varphi_B T)} \cong$$
$$e^{2j\varphi_{TB} - j\Delta\omega \Delta t} = e^{2j\psi_{TB}} e^{-j\varphi_\Delta}.$$

Thus, as may be understood from the above, the tag 20 receives a signal defining a phase therefor that is directly proportional to the round-trip phase shift for the CT transmitted from the tag 20 and back via the beacon 30. In this regard, the factor, $e^{-j\varphi_\Delta}$, will be understood as being substantially constant in magnitude so as to account for typical LO tolerances, such that ranging data based on $Z_{BT}$ is not materially affected.

In referring to FIG. 10, there is illustrated a manner of establishing phase-coherent signaling in the context of the above-discussed TDOA framework for assessing phase shift due to path length differences. In particular, such phase coherence may be established for signaling as between respective ones of beacons 30 of a beacon 30 pod. As has been explained, each of such one or more pods may include at least one master beacon MB and at least two (2) slave beacons (SBs) so as to accomplish the goal of establishing ranging data with respect to a tag 20. In particular, each of the MB and SBs of a given pod may engage in wireless communications such that, in response to a CT received from the MB at and/or within a channel, SBs phase synchronize their respective LOs to that of the MB. In this way, the MB acts a phase datum allowing for phase coherence among each of the MB and SBs of a given pod thereof.

In achieving implementation of this datum, the process begins at 1010, and proceeds to 1020 whereat the MB transmits a CT as part of its advertisement message (also including its coordinates and transmission timing prescribed for each of participating SBs) to SBs within its pod. Notably, the advertisement will include a flag identifying the MB as such, and only be transmitted by the MB according to the pod configuration, i.e., only to SBs for the pod including that MB. Upon receipt of the advertisement by the tag 20, it stores the pod data and begins its ranging hops (subsequent to pilot signal processing and gain setting as discussed above). Simultaneously, SBs in receipt of the advertisement, and for a given pod corresponding to the MB, adjust their LO phase at 1080 to phase synchronize with the phase of the MB LO. In this regard, the CT downconverted at a SB may be given by the following, in which $Z_{MBSB}$ corresponds to transmission of the CT from a MB to a SB and $$Z_{MBSB}=e^{-j(\omega_{SB}t_0+\varphi_{SB})}e^{j(\omega_{MB}t_0+\varphi_{MB}+\varphi_{MBSB})}=e^{j(\Delta\omega t_0-\varphi_{SB}+\varphi_{MB}+\varphi_{MBSB})},$$

wherein:
$\omega_{MB}$ and $\varphi_{MB}$ represent the MB's LO angular frequency and phase;
$\omega_{SB}$ and $\varphi_{SB}$ represent the SB'S angular frequency and phase;
$t_0$ represents the reception time at the SB; and
$\varphi_{MBSB}$ represents a phase shift given while travelling a distance d between the MB and the SB, and is given by:

$$\varphi_{MBSB} = \frac{\omega_{MB} \cdot d}{c}.$$

To carry out the adjustment, each SB within a pod measures the phase of $Z_{MBSB}$, as $\varphi Z_{MBSB}$ radians. Further, and relative to its own coordinate location and such location of the MB as derived from the received advertisement, a respective SB also calculates $\varphi_{MBSB}$ (assuming $\omega_{MB} \cong \omega_{SB}$). Based on these criteria, each respective SB may achieve phase synchronization with the MB LO by adjusting its LO phase by an amount of phase equal to $\angle Z_{MBSB}$ minus $\varphi_{MBSB}$. See FIG. 11 regarding steps 1110-1120. In doing so, the propagation phase shift of $Z_{MBSB}$ is removed from the phase at the SB LO so that it may transmit at the phase according to the MB's antenna. The effect of such removal may be seen in FIG. 6, relative to the phase of signaling transmitted by the MB before synchronization and as compared to a substantially commensurate, i.e., equal, phase of signaling to be transmitted by an SB after such synchronization.

Once having achieved the adjustment, and thus phase coherence of signaling as between the SB and the MB, each SB, at 1090, transmits its CT to the tag 20 in accordance with its prescribed transmission time slot. Such CT, now synched to the phase of the MB's LO, may be given by $Z_{SB}=e^{j(\omega_{SB}t+\varphi_{MB})}$, whereby, as a result of synchronization, the SB's phase offset of $j(\omega_{SB}t+\varphi_{MB})$ matches that of the MB.

As shown at each of 1070 and 1095, the tag 20 may IQ sample and average respective signaling from each of the MB and SBs of one or more beacon pods at each channel for which ranging hops occurred, and store such samples for establishment of ranging data based on the aforementioned phase coherence of signaling as between a MB and SB. Such samples may be given by the following, in which $$Z_{MBT}=e^{-j(\omega_{T_1}+\varphi_T)}e^{j(\omega_{MB}t_1+\varphi_{MB}+\varphi_{MBT})}=$$
$$e^{j(\varphi_{MBT}-\Delta\omega_{MB}t_1-\varphi_T+\varphi_{MB})}=e^{j\varphi_{MBT}}$$
$$e^{j(\varphi_{MB}-\Delta\omega_{MB}t_1-\varphi_T)}=e^{j\varphi_{MBT}}e^{j\varphi_\Delta}; \text{ and}$$

$$Z_{SBT}=e^{-j(\omega_{T_2}+\varphi_T)}e^{j(\omega_{SB}t_2+\varphi_{MB}+\varphi_{SBT})}=e^{j(\varphi_{SBT}-\Delta\omega_{SBT_2}-\varphi_T+\varphi_{MB})}=e^{j\varphi_{SBT}}e^{j(\varphi_{MB}-\Delta\omega_{SBT_2}-\varphi_T)}\cong e^{j\varphi_{SBT}}e^{j\varphi_\Delta}.$$

As will be understood, such ranging data may include, for each of given channels of the band on which hopping occurred, the product of such samples in the form of $Z_{MBT} \times Z^*_{SBT} = e^{j\varphi_{MBT}}e^{j\varphi_\Delta} \times e^{-j\varphi_{SBT}}e^{-j\varphi_\Delta} = e^{j(\varphi_{MBT}-\varphi_{SBT})}$, wherein (*) represents the conjugate.

As an alternative to the aforementioned TDOA framework adjustment in which a SB accounts for the phase shift $\varphi_{MBSB}$ when formulating its synchronization with the MB LO, such synchronization may also be configured to comport with the MB LO only to the extent of $\angle Z_{MBSB}$ radians. That is, whereas the TDOA framework adjustment discussed in detail above accounts for the phase shift $\varphi_{MBSB}$ owing to propagation between the MB and the SB, such adjustment may otherwise be tailored to retain that phase shift when transmitting phase coherent signaling from a SB to a tag 20. See FIG. 11 at 1130. In doing so, the herein discussed alternative TDOA framework adjustment establishes a shift in responsibility when compensating for $\varphi_{MBSB}$ among the SB and the tag 20 wherein the tag 20 is tasked with accomplishing such compensation when establishing its ranging data.

In these regards, a CT of the SB, which is thus synchronized with the MB's LO, may be given by $Z_{SB}=e^{j(\omega_{SB}t+\varphi_{MB}+\varphi_{MBSB})}$. Thus, as shown at each of 1070 and 1095, the tag 20 may IQ sample and average respective signaling from each of the MB and SBs of one or more beacon pods at each channel for which ranging hops occurred, and store averaged samples for establishment of ranging data based on the aforementioned phase coherence of signaling as between a MB and SB. Such samples may be given by the following, in which $$Z_{MBT}=e^{-j(\omega_{T_1}+\varphi_T)}e^{j(\omega_{MB}t_1+\varphi_{MB}+\varphi_{MBT})}=$$
$$e^{j(\varphi_{MBT}-\Delta\omega_{MBT_1}-\varphi_T+\varphi_{MB})}=e^{j\varphi_{MBT}}$$
$$e^{j(\varphi_{MB}-\Delta\omega_{MBT_1}-\varphi_T)}=e^{j\varphi_{MBT}}e^{j\varphi_\Delta}; \text{ and}$$

$$Z_{SBT}=e^{-j(\omega_{T_2}+\varphi_T)}e^{j(\omega_{SB}t_2+\varphi_{MB}+\varphi_{SBT})}=$$
$$e^{j(\varphi_{SBT}-\Delta\omega_{SBT_2}-\varphi_T+\varphi_{MB})}=$$
$$e^{j\varphi_{SBT}}e^{j(\varphi_{MB}-\Delta\omega_{SBT_2}-\varphi_T)}\cong e^{j\varphi_{SBT}}e^{j\varphi_\Delta}.$$

Based upon receipt of such sampling at the tag 20 from each an MB and constituent pod SBs, the tag 20 may then establish ranging data inclusive of, for each of given channels of the band on which hopping occurred, the product of such samples in the form of $Z_{MBT} \times Z^*_{SBT} = e^{j\varphi_{MBT}}e^{j\varphi_\Delta} \times e^{-j\varphi_{SBT}}e^{-j\varphi_\Delta} = e^{j(\varphi_{MBT}-\varphi_{SBT})}$, wherein (*) represents the conjugate.

In doing so, phase differential between respective MB and SB samples $Z_{MBT}$ and $Z_{SBT}$ may be negated such that PS represents, for each of the MB IQ samples $Z_{MBT}$ and SB IQ samples $Z_{SBT}$ as to channels across the BLE band, a phase measurement sample defining the phase shift for signaling as between the MB and SB due to respectively different paths of that signaling for a given, i.e., same, channel.

A window according to, for example, Hanning or Blackman-Harris, may then be applied to the PS samples, which may then be zero padded to reach a power of two (2), nominally 128. Thereafter, an Inverse Fast Fourier Transform (IFFT) may be performed with respect to the PS samples for each channel spanning the BLE band, in accordance with IFFT bin spacing in meters defined by $$\frac{c}{N \times f_\Delta},$$

where c is the speed of light in meters, N represents the number of points in the IFFT, and $f_\Delta$ represents the spacing of the CTs in each transmitted beacon advertisement message.

Figure 12:
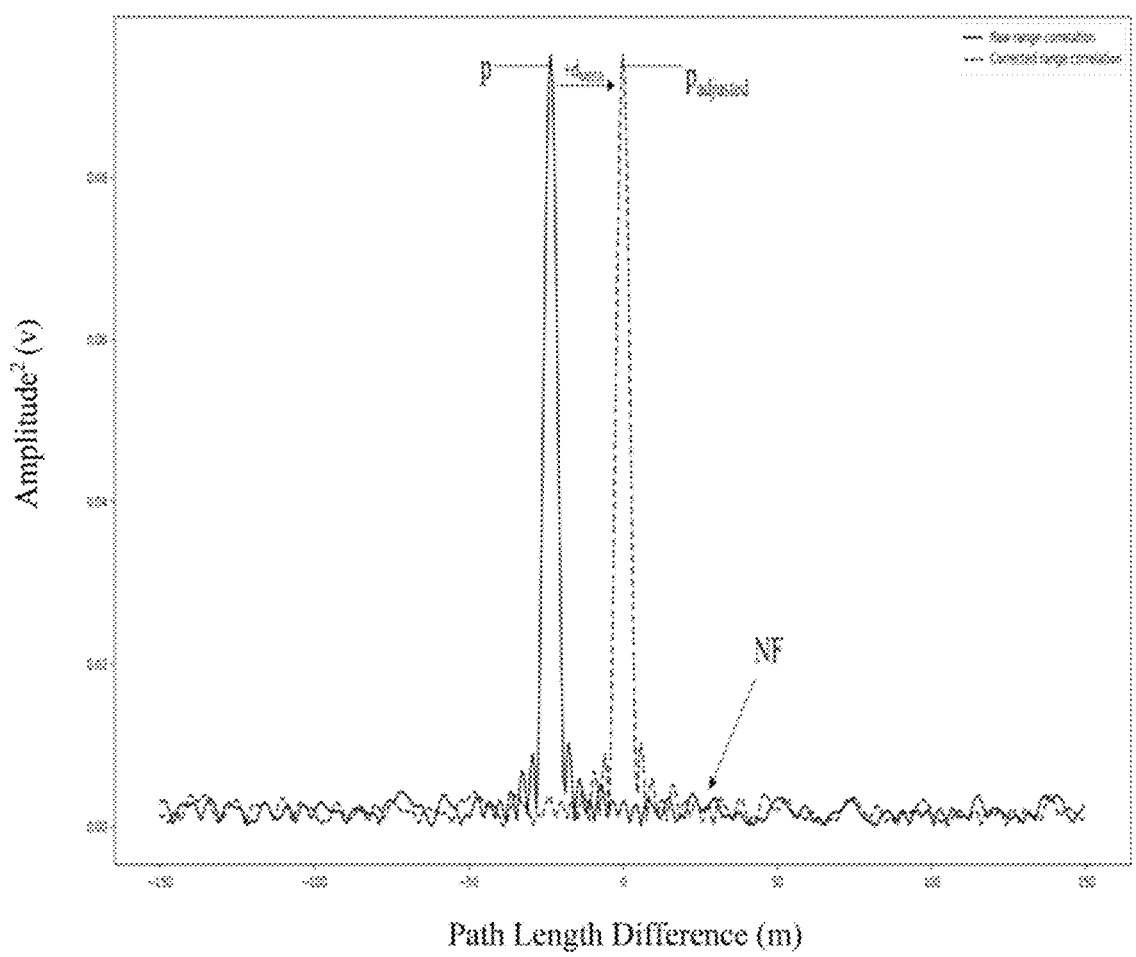
FIG. 12 is a graph illustrating a range difference correlation due to radio frequency (RF) path difference as between signaling of each of a pair of members of a beacon pod in which phase shift therebetween is compensated for in accordance with a separation distance between the members of the beacon pod.

For phase measurement samples PS as between the MB and the SB, a range difference correlation curve (RDCC) may be derived, as shown in FIG. 12, that plots amplitude squared (in volts) versus a difference in path length (in meters). A peak value (p), in the absence of multipath propagation, or when low multipath propagation may be experienced, may then be demonstrated for use in determining the differential distance in paths of signaling transmitted by the MB and the SB. In this regard, the value of the peak p defining the differential distance may be correlated according to the following path length difference (PLD):

PLD=(p\*c)/(IFFT_LEN\*CH_SPACING), in which p is the peak of the IFFT, c is the speed of light, IFFT_LEN is the number of samples in the IFFT, and CH_SPACING is the BLE channel spacing in Hz (nominally 2 MHz). Thus, based upon the IFFT peak value p, a true value of the path length difference PLD between the MB and SB may be correlated.

Here, it may be seen that the IFFT peak p, or highest magnitude phase shift, may be approximately 0.98 $v^2$, and which correlates to a true path length difference PLD between signaling of each of the MB and SB to the tag 20 of about 23 m (shown as −23 m given orientation of the MB and SB relative to the tag 20). The peak p may be referenced with regard to the observed noise floor (NF), i.e., the sum of all noise sources and unwanted signaling.

In still referring to FIG. 12, and since the tag 20 may determine a separation distance $d_{MBSB}$ (as determined by the physical distance derived from respective position information of each of the MB and SB), for example, 23 m, the tag 20 may compensate for phase shift $\varphi_{MBSB}$ (see 1140) by adding the separation distance $d_{MBSB}$ to the originally correlated PLD peak p (as shown by the raw range correlation in solid line) to arrive at an adjusted peak $p_{adjusted}$ (as shown by the corrected range correlation in broken line) and its corresponding adjusted PLD. In the exemplary scenario of FIG. 12 showing the originally correlated peak p for a tag 20 situated equidistandtly among the MB and the SB, $p_{adjusted}$ may therefor equate to a PLD with respect to tag 20 of zero (0). Such compensation may, it will be understood, be conducted by the tag 20 for each MB and SB pairs corresponding to a beacon pod 30 whereas the tag 20 is then equipped to determine, based on such compensation, its relative coordinate location according to techniques as are described in the aforementioned commonly owned U.S. patent application Ser. No. 17/036,079, entitled "Apparatus and Method for Geolocating a Tag Via Phase-Based Time Difference of Arrival Framework."

In view of the above, it will be understood that the presently discussed embodiments enable phase coherence among signaling providing basis for the calculation of ranging data between, for example, a tag and one or more beacons in the context of ToF and TDOA measurement accounting for relative phase shift. As such, efficacy in calculation of such ranging data at the tag may be heightened since phase coherence may be established remotely, i.e., away from the tag and at a single transmission source such as a beacon. In this way, the beacon and the tag may each act independently of each other when, respectively, formulating such signaling for transmission and calculating ranging data based on phase coherence embodied by such signaling. Accordingly, processing burden at the tag, in the context of the BLE tag/beacon relationship(s) discussed herein, may be reduced as consideration of phase specifically attributable to one or more beacons is made unnecessary. Additionally, and relatedly, processing of beacon signaling at such a tag may occur expeditiously and with decreased power consumption since the tag does not receive specific IQ sampling performed at the beacon. Further, and resultingly, ranging accuracy and reliability may be enhanced since the establishment of ranging data, as discussed herein, may thus be achieved absent the addition of the aforementioned sampling.

The present embodiments are not limited to the particular embodiments illustrated in the drawings and described above in detail. Those skilled in the art will recognize that other arrangements could be devised. The present embodiments encompass every possible combination of the various features of each embodiment disclosed. One or more of the elements described herein with respect to various embodiments can be implemented in a more separated or integrated manner than explicitly described, or even removed or rendered as inoperable in certain cases, as is useful in accordance with a particular application. While the present embodiments have been described with reference to specific illustrative embodiments, modifications and variations of the present embodiments may be constructed without departing from the spirit and scope of the present embodiments as set forth in the following claims.

While the present embodiments have been described in the context of the embodiments explicitly discussed herein, those skilled in the art will appreciate that the present embodiments are capable of being implemented and distributed in the form of a computer-usable medium (in a variety of forms) containing computer-executable instructions, and that the present embodiments apply equally regardless of the particular type of computer-usable medium which is used to carry out the distribution. An exemplary computer-usable medium is coupled to a computer such the computer can read information including the computer-executable instructions therefrom, and (optionally) write information thereto. Alternatively, the computer-usable medium may be integral to the computer. When the computer-executable instructions are loaded into and executed by the computer, the computer becomes an apparatus for practicing the embodiments. For example, when the computer-executable instructions are loaded into and executed by a general-purpose computer, the general-purpose computer becomes configured thereby into a special-purpose computer. Examples of suitable computer-usable media include: volatile memory such as random access memory (RAM); nonvolatile, hard-coded or programmable-type media such as read only memories (ROMs) or erasable, electrically programmable read only memories (EEPROMs); recordable-type and/or re-recordable media such as floppy disks, hard disk drives, compact discs (CDs), digital versatile discs (DVDs), etc.; and transmission-type media, e.g., digital and/or analog communications links such as those based on electrical-current conductors, light conductors and/or electromagnetic radiation.

Although the present embodiments have been described in detail, those skilled in the art will understand that various changes, substitutions, variations, enhancements, nuances, gradations, lesser forms, alterations, revisions, improvements and knock-offs of the embodiments disclosed herein may be made without departing from the spirit and scope of the embodiments in their broadest form.

What is claimed is:

1. A system for generating phase-coherent wireless signaling, comprising:
a first node configured to transmit at least a first Constant Tone (CT) across channels of a given frequency band; and
a second node configured to
(a) receive the at least a first CT at a given one of said channels, and synchronize a frequency of a local oscillator (LO) thereof according to a frequency of the at least a first CT;
(b) downconvert the at least a first received CT to generate a complex baseband signal (CBS);
(c) sample the CBS in in-phase and quadrature (IQ) format over a predetermined time to measure a phase of the CBS; and
(d) adjust a phase for the LO, based on the measured phase of the CBS, to synchronize a phase of at least a second CT, to be transmitted from the second node, with the measured phase of the CBS at the given one of the channels,
wherein the first node is further configured to transmit position information corresponding to the first node and the second node when transmitting the at least a first CT, and the at least a second CT to be transmitted from the second node comprises an amount of phase defined by a phase shift attributable to propagation of the at least a first received CT from the first node to the second node.

2. The system according to claim 1, further comprising:
a tag configured to receive each of the at least a first CT, the at least a second CT, and the position information, and determine ranging data as between each of the tag, the first node and the second node based on receipt of the at least a first CT, the at least a second CT, and the position information.

3. The system according to claim 2, wherein:
based on receipt of the at least a second CT at the tag, the determination of the ranging data comprises a correlation of the phase shift attributable to propagation of the at least a first received CT from the first node to the second node to a path length difference between each of the first node and the second node and the tag.

4. The system according to claim 3, wherein:
the tag is further configured to adjust the correlation by adding a physical distance defined between each of the first node and the second node, based on the position information of the first node and the second node, to the path length difference.

5. The system according to claim 4, wherein:
the adjustment in phase is obtained via any one of a direct phase shift setting of the LO and frequency modulation.

6. A method of generating phase-coherent wireless signaling, comprising:
transmitting, from a first node, at least a first Constant Tone (CT) across channels of a given frequency band; and
at a second node,
(a) receiving the at least a first CT at a given one of said channels, and synchronizing a frequency of a local oscillator (LO) thereof according to a frequency of the at least a first CT;
(b) downconverting the at least a first received CT to generate a complex baseband signal (CBS);
(c) sampling the CBS in in-phase and quadrature (IQ) format over a predetermined time to measure a phase of the CBS; and
(d) adjusting a phase for the LO, based on the measured phase of the CBS, to synchronize a phase of at least a second CT, to be transmitted from the second node, with the measured phase of the CBS at the given one of the channels,
wherein the first node is further configured to transmit position information corresponding to the first node and the second node when transmitting the at least a first CT, and the at least a second CT to be transmitted from the second node comprises an amount of phase defined by a phase shift attributable to propagation of the at least a first received CT from the first node to the second node.

7. The method according to claim 6, further comprising:
receiving, at a tag, each of the at least a first CT, the at least a second CT, and the position information, and determining, at the tag, ranging data as between each of the tag, the first node and the second node based on receipt of the at least a first CT, the at least a second CT, and the position information.

8. The method according to claim 7, wherein:
based on receipt of the at least a second CT at the tag, the determination of the ranging data comprises a correlation of the phase shift attributable to propagation of the at least a first received CT from the first node to the second node to a path length difference between each of the first node and the second node and the tag.

9. The method according to claim 8, further comprising:
adjusting, at the tag, the correlation by adding a physical distance defined between each of the first node and the second node, based on the position information of the first node and the second node, to the path length difference.

10. The method according to claim 9, wherein:
the adjustment in phase is obtained via any one of a direct phase shift setting of the LO and frequency modulation.

* * * * *